United States Patent Office 3,197,419
Patented July 27, 1965

3,197,419
MIXED ANTIMONY OXIDE-IRON OXIDE
OXIDATION CATALYST
James L. Callahan, Cuyahoga County, Ohio, and Berthold Gertisser, Essex County, N.J., assignors to The Standard Oil Company, Cleveland, Ohio, a corporation of Ohio
No Drawing. Filed Jan. 8, 1963, Ser. No. 250,008
7 Claims. (Cl. 252—456)

This application is a continuation-in-part of copending application Serial No. 201,321, filed June 11, 1962, and now abandoned. This invention relates to oxidation catalyst systems consisting essentially of oxides of antimony and iron and to the catalytic oxidation of olefins to oxygenated hydrocarbons such as unsaturated aldehydes and acids, for example, propylene to acrolein, and isobutylene to methacrolein and methacrylic acid, and to the oxidation of olefin-ammonia mixtures to unsaturated nitriles, such as propylene-ammonia to acrylonitrile, and isobutylene-ammonia to methacrylonitrile, using such systems.

U.S. Patent No. 2,9044,580 dated September 15, 1959, describes a catalyst composed of antimony oxide and molybdenum oxide, as antimony molybdate, and indicates its utility in converting propylene to acrylonitrile.

British Patent 864,666 published April 6, 1961, describes a catalyst composed of an antimony oxide alone or in combination with a molybdenum oxide, a tungsten oxide, a tellurium oxide, a copper oxide, a titanium oxide, or a cobalt oxide. These catalysts are said to be either mixtures of these oxides or oxygen-containing compounds of antimony with the other metal, such as antimony molybdate or molybdo-antimonate. These catalyst systems are said to be useful in the production of unsaturated aldehydes such as acrolein or methacrolein from olefins such as propylene or isobutene and oxygen.

British Patent 876,446 published August 30, 1961, describes catalysts including antimony, oxygen and tin, and said to be either mixtures of antimony oxides with tin oxides, or oxygen-containing compounds of antimony and tin such as tin antimonate. These catalysts are said to be useful in the production of unsaturated aliphatic nitriles such as acrylonitrile from olefins such as propylene, oxygen and ammonia.

(I) THE CATALYST

In accordance with the invention, an oxidation catalyst is provided consisting essentially of oxides of antimony and iron. This catalyst is useful not only in the oxidation of olefins to oxygenated hydrocarbons such as unsaturated aldehydes and acids, for example acrolein and methacrolein, and acrylic and methacrylic acids, and the oxidation of olefin-ammonia mixtures to unsaturated nitriles such as acrylonitrile and methacrylonitrile but also in the catalytic oxidative dehydrogenation of olefins to diolefins.

The nature of the chemical compounds which compose the catalyst of the invention is not known. The catalyst may be a mixture of antimony oxide or oxides and iron oxide or oxides. It is also possible that the antimony and iron are combined with the oxygen to form an antimonate. X-ray examination of the catalyst system has indicated the presence of a structurally common phase of the antimony type, composed of antimony oxide, and some form of iron oxide. Antimony tetroxide has been identified as present. For the purposes of description of the invention, this catalyst system will be referred to as a mixture of antimony and iron oxides, but this is not to be construed as meaning that the catalyst is composed either in whole or in part of these compounds.

The proportions of antimony and iron in the catalyst system may vary widely. The Sb:Fe atomic ratio can range from about 1:50 to about 99:1. However, optimum activity appears to be obtained at Sb:Fe atomic ratios within the range from 1:1 to 25:1.

The catalyst can be employed without support, and will display excellent activity. It also can be combined with a support, and preferably at least 10% up to about 90% of the supporting compound by weight of the entire composition is employed in this event. Any known support materials can be used, such as, for example, silica, alumina, zirconia, alundum, silicon carbide, alumina-silica, and the inorganic phosphates, silicates, aluminates, borates and carbonates stable under the reaction conditions to be encountered in the use of the catalyst.

The antimony oxide and iron oxide can be blended together, or can be formed separately and then blended, or formed separately or together in situ. As starting materials for the antimony oxide component, for example, there can be used any antimony oxide, such as antimony trioxide, antimony tetroxide and antimony pentoxide, or mixtures thereof; or a hydrous antimony oxide, metaantimonic acid, orthoantimonic acid or pyroantimonic acid; or a hydrolyzable or decomposable antimony salt, such as an antimony halide, for example, antimony trichloride, trifluoride or tribromide; antimony pentachloride and antimony pentafluoride, which is hydrolyzable in water to form the hydrous oxide. Antimony metal can be employed, the hydrous oxide being formed by oxidizing the metal with an oxidizing acid such as nitric acid.

The iron oxide component can be provided in the form of ferrous, ferric or ferrous-ferric oxides, or by precipitation in situ from a soluble iron salt such as the nitrate, acetate, or a halide such as the chloride. Free iron can be used as a starting material, and if antimony metal is also employed, the antimony can be converted to the oxide and the iron to the nitrate simultaneously by oxidation in hot nitric acid. A slurry of hydrous antimony oxide in nitric acid can be combined with a solution of an iron salt such as ferric nitrate, which is then precipitated in situ as ferric hydroxide by making the solution alkaline with ammonium hydroxide, the ammonium nitrate and the other ammonium salts being removed by filtration of the resulting slurry.

It will be apparent from the above that ferrous and ferric bromides, chlorides, fluorides and iodides, nitrites, acetates, sulfites, sulfates, phosphates, thiocyanates, thiosulfates, oxalates, formates and hydroxides can be employed as the source of the iron oxide component.

The catalytic activity of the system is enhanced by heating at an elevated temperature. Preferably, the catalyst mixture is dried and heated at a temperature of from about 500 to about 1150° F. preferablby at about 700 to 900° F., for from two to twenty-four hours. If activity then is not sufficient, the catalyst can be further heated at a temperature above about 1000° F. but below a temperature deleterious to the catalyst at which it is melted or decomposed, preferably from about 1400° F. to about 1900° F. for from one to forty-eight hours, in the presence of air or oxygen. Usually this limit is not reached before 2000° F., and in some cases this temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed can be replaced.

The antimony oxide-iron oxide catalyst composition of the invention can be defined by the following empirical formula:

$$Sb_a Fe_b O_c$$

where $a$ is 1 to 99, $b$ is 50 to 1, and $c$ is a number taken to satisfy the average valences of antimony and iron in the oxidation states in which they exist in the catalyst as defined by the empirical formula above. Thus, the Sb valance may range from 3 to 5 and the Fe valance from 2 to 3.

This catalyst system is useful in the oxidation of olefins to oxygenated compounds, such as aldehydes and acids, in the presence of oxygen, and in the oxidation of olefins to unsaturated nitriles in the presence of oxygen and ammonia. Nitriles and oxygenated compounds such as aldehydes and acids can be produced simultaneously using process conditions within the overlapping ranges for these reactions, as set forth in detail below. The relative proportions of each that are obtainable will depend on the catalyst and on the olefin. The same catalyst may produce predominantly the nitrile with propylene and predominantly the aldehyde and/or acid with isobutylene. The term "oxidation" as used in this specification and claims encompasses the oxidation to aldehydes and acids and to nitriles, all of which conversions require oxygen as a reactant.

(II) OXIDATION OF OLEFINS TO ALDEHYDES AND ACIDS

The reactants used in the oxidation to oxygenated compounds are oxygen and an olefin having only three carbon atoms in a straight chain such as propylene or isobutylene, or mixtures thereof.

The olefins may be in admixture with paraffinic hydrocarbons, such as ethane, propane, butane and pentane, for example, a propylene-propane mixture may constitute the feed. This makes it possible to use ordinary refinery streams without special preparation.

The temperature at which this oxidation is conducted may vary considerably depending upon the catalyst, the particular olefin being oxidized and the correlated conditions of the rate of throughput or contact time and the ratio of olefin to oxygen. In general, when operating at pressures near atmospheric, i.e., $-10$ to 100 p.s.i.g., temperatures in the range of 500 to 1100° F. may be advantageously employed. However, the process may be conducted at other pressures, and in the case where superatmospheric pressures, e.g., above 100 p.s.i.g., are employed, somewhat lower temperatures are feasible. In the case where this process is employed to convert propylene to acrolein, or isobutylene to methacrolein and methacrylic acid, a temperature range of from 750 to 950° F. has been found to be optimum at atmospheric pressure.

While pressures other than atmospheric may be employed, it is generally preferred to operate at or near atmospheric pressure, since the reaction proceeds well at such pressures and the use of expensive high pressure equipment is avoided.

The apparent contact time employed in the process is not critical and may be selected from a broad operable range which may vary from 0.1 to 50 seconds. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture.

The optimum contact time, will, of course, vary depending upon the olefin being treated, but in the case of propylene and isobutylene the preferred apparent contact time is 0.5 to 15 seconds.

A molar ratio of oxygen to olefin between about 0.5:1 to 5:1 generally gives the most satisfactory results. For the conversion of propylene to acrolein, and isobutylene to methacrolein and methacrylic acid, a preferred ratio of oxygen to olefin is from about 1:1 to about 2:1. The oxygen used in the process may be derived from any source; however, air is the least expensive source of oxygen, and is preferred for that reason.

We have also discovered that the addition of water to the reaction mixture has a marked beneficial influence on the course of the reaction in that it improves the conversion and the yield of the desired product. The manner in which water affects the reaction is not fully understood but the theory of this phenomenon is not deemed important in view of the experimental results we have obtained. Accordingly, we prefer to include water in the reaction mixture. Generally, a ratio of olefin to water in the reaction mixture of from 1:0.5 to 1:10 will give very satisfactory results, and a ratio of from 1:1 to 1:6 has been found to be optimum when converting propylene to acrolein, and isobutylene to methacrolein and methacrylic acid. The water, of course, will be in the vapor phase during the reaction.

Inert diluents such as nitrogen and carbon dioxide may be present in the reaction mixture.

In general, any apparatus of the type suitable for carrying out oxidation reactions in the vapor phase may be employed for the execution of the process. The process may be operated continuously or intermittently, and may employ a fixed bed with a large particulate or pelleted catalyst, or a so-called "fluidized" bed of catalyst. The fluidized bed permits a closer control of the temperatures of the reaction, as is well known to those skilled in the art, and a fixed bed gives closer control of contact time.

The reactor may be brought to the reaction temperature before or after the introduction of the vapors to be reacted. In a large scale operation, it is preferred to carry out the process in a continuous manner and in this system the recirculation of unreacted olefin and/or oxygen is contemplated. Periodic regeneration or reactivation of the catalyst is also contemplated. This may be accomplished, for example, by contacting the catalyst with air at an elevated temperature.

The unsaturated carbonyl product or products may be isolated from the gases leaving the reaction zone by any appropriate means, the exact procedure in any given case being determined by the nature and quantity of the reaction products. For example, the excess gas may be scrubbed with cold water or an appropriate solvent to remove the carbonyl product. In the case where the products are recovered in this manner, the ultimate recovery from the solvent may be by any suitable means such as distillation. The efficiency of the scrubbing operation may be improved when water is employed as the scrubbing agent by adding a suitable wetting agent to the water. If desired, the scrubbing of the reaction gases may be preceded by a cold water quench of the gases which of itself will serve to separate a significant amount of the carbonyl products. Where molecular oxygen is employed as the oxidizing agent in this process, the resulting product mixture remaining after the removal of the carbonyl product may be treated to remove carbon dioxide with the remainder of the mixture comprising any unreacted olefin and oxygen being recycled through the reactor. In the case where air is employed as the oxidizing agent in lieu of molecular oxygen, the residual product after separation of the carbonyl product may be scrubbed with a non-polar solvent, e.g., a hydrocarbon fraction, in order to uncover unreacted olefin and in this case the remaining gases may be discarded. An inhibitor to prevent polymerization of the unsaturated products, as is well known in the art, may be added at any stage.

(III) OXIDATION OF OLEFINS TO NITRILES

The reactants used are the same as in II above, plus ammonia. Any of the olefins described can be used.

In its preferred aspect, the process comprises contacting a mixture comprising propylene or isobutylene, ammonia and oxygen with the catalyst at an elevated temperature and at atmospheric or near atmospheric pressure.

Any source of oxygen may be employed in this process. For economic reasons, however, it is preferred that air be employed as the source of oxygen. From a purely technical viewpoint, relatively pure molecular oxygen will give equivalent results. The molar ratio of oxygen to the olefin in the feed to the reaction vessel should be in the range of 0.5:1 to 4:1 and a ratio of about 1:1 to 3:1 is preferred.

Low molecular weight saturated hydrocarbons do not appear to influence the reaction to an appreciable degree, and these materials can be present. Consequently, the addition of saturated hydrocarbons to the feed to the reaction is contemplated within the scope of this invention. Likewise, diluents such as nitrogen and the oxides of carbon may be present in the reaction mixture without deleterious effect.

The molar ratio of ammonia to olefin in the feed to the reaction may vary between about 0.05:1 to 5:1. There is no real upper limit for the ammonia-olefin ratio, but there is generally no reason to exceed the 5:1 ratio. At ammonia-olefin ratios appreciably less than the stoichiomertic ratio of 1:1, various amounts of oxygenated derivatives of the olefin will be formed.

Significant amounts of unsaturated aldehydes and even unsaturated acids as well as nitriles will be obtained at ammonia-olefin ratios substantially below 1:1, i.e., in the range of 0.15:1 to 0.75:1, particularly in the case of higher olefins such as isobutylene. Outside the upper limit of this range only insignificant amounts of aldehydes and acids will be produced, and only very small amounts of nitriles will be produced at ammonia-olefin ratios below the lower limit of this range. It is fortuitous that within the ammonia-olefin range stated, maximum utilization of ammonia is obtained, and this is highly desirable. It is generally possible to recycle any unreacted olefin and unconverted ammonia.

A particularly surprising aspect of this invention is the effect of water on the course of the reaction. We have found that in many cases water in the mixture fed to the reaction vessel improves the selectivity of the reaction and yield of nitrile. However, reactions not including water in the feed are not to be excluded from this invention, inasmuch as water is formed in the course of the reaction.

In general, the molar ratio of added water to olefin, when water is added, is at least about 0.25:1. Ratios on the order of 1:1 to 3:1 are particularly desirable, but higher ratios may be employed, i.e., up to about 10:1.

The reaction is carried out at a temperature within the range from about 550 to about 1100° F. The preferred temperature range is from about 800 to 1000° F.

The pressure at which reaction is conducted is also an important variable, and the reaction should be carried out at about atmospheric or slightly above atmospheric (2 to 3 atmospheres) pressure. In general, high pressures, i.e., about 250 p.s.i.g., are not suitable, since higher pressures tend to favor the formation of undesirable by-products.

The apparent contact time is not critical, and contact time in the range of from 0.1 to about 50 seconds may be employed. The optimum contact time will, of course, vary, depending upon the olefin being treated, but in general, a contact time of from 1 to 15 seconds is preferred.

In general, any apparatus of the type suitable for carrying out oxidation reactions in the vapor phase may be employed in the execution of this process. The process may be conducted either continuously or intermittently. The catalyst bed may be a fixed bed employing a large particulate or pelleted catalyst or, in the alternative, a so-called "fluidized" bed of catalyst may be employed.

The reactor may be brought to the reaction temperature before or after the introduction of the reaction feed mixture. However, in a large scale operation, it is preferred to carry out the process in a continuous manner, and in such a system the recirculation of the unreacted olefin is contemplated. Periodic regeneration or reactivation of the catalyst is also contemplated, and this may be accomplished, for example, by contacting the catalyst with air at an elevated temperature.

The products of the reaction may be recovered by any of the methods known to those skilled in the art. One such method involves scrubbing the effluent gases from the reactor with cold water or an appropriate solvent to remove the products of the reaction. If desired, acidified water can be used to absorb the products of reaction and neutralize unconverted ammonia. The ultimate recovery of the products may be accomplished by conventional means. The efficiency of the scrubbing operation may be improved when water is employed as the scrubbing agent by adding a suitable wetting agent to the water. Where molecular oxygen is employed as the oxidizing agent in this process, the resulting product mixture remaining after the removal of the nitriles may be treated to remove carbon dioxide with the remainder of the mixture containing the unreacted olefin and oxygen being recycled through the reactor. In the case where air is employed as the oxidizing agent in lieu of molecular oxygen, the residual product after separation of the nitriles and other carbonyl products may be scrubbed with a non-polar solvent, e.g., a hydrocarbon fraction, in order to recover unreacted olefin and in this case the remaining gases may be discarded. The addition of a suitable inhibitor to prevent polymerization of the unsaturated products during the recovery steps is also contemplated.

The following examples, in the opinion of the inventors, represent preferred embodiments of the catalyst system of the invention, and of the processes of oxidation of olefins therewith.

*Example 1*

The following procedure was employed to prepare a catalyst composed of 95% antimony oxide and 5% iron oxide having an Sb:Fe ratio of 8.7:1. 200 g. of antimony metal (less than 270 mesh) was heated in 826.7 cc. of concentrated nitric acid until all red oxides of nitrogen had been given off. To this was added an aqueous solution of 75.96 g. of ferric nitrate nonahydrate $Fe(NO_3)_3 \cdot 9H_2O$. The slurry was diluted with approximately 400 cc. of water. Approximately 500 cc. of 28% ammonium hydroxide was added, bringing the pH to from 7.6 to 8.0. The slurry was filtered, and washed with 400 cc. of 2.5% ammonium hydroxide solution, divided into three portions. Air was drawn through the filter cake for 15 minutes following the last washing. The catalyst was dried overnight at 130° C., calcined at 800° F. overnight, and heat-treated overnight at 1400° F. in a muffle furnace open to the atmosphere.

The activity of this catalyst in the conversion of propylene to acrylonitrile was determined using a micro reactor composed of a feed induction system, a molten salt bath furnace reactor, sampling valve and vapor phase chromatograph. The reactor was placed in the salt bath furnace, and connected with the feed induction system and sampling device. With an apparent contact time of 3 seconds, the reaction was carried out at a temperature in the range of 800–840° F., using a catalyst charge of 8.2 g. The feed molar ratio propylene/$NH_3$/air was 1/1/12. The total conversion was 87.0% per pass of which 63.1% of the propylene feed was converted to acrylonitrile, 2.0% to acetonitrile, and the remainder to carbon oxides.

*Examples 2 to 4*

A catalyst having an Sb:Fe ratio of 1.4:1 was prepared according to the following procedure. 90 g. of antimony metal was oxidized in 370 cc. of boiling nitric acid (specific gravity 1.42) until evolution of oxides of nitrogen had ceased. The suspension of antimony oxide in the nitric acid was then added to a solution containing 218 g. of ferric nitrate nonahydrate. The resulting mixture was blended with 300 cc. of 28% ammonium hydroxide solution with vigorous stirring, and the slurry filtered. The filter cake was washed with 200 cc. of water divided into 3 equal portions. Air was drawn through the filter cake for 10 minutes. The material was then dried at 120° C. The resulting powder was passed through a 35 mesh sieve, pelleted, and calcined at 800° F. overnight. The catalyst was then heated in a muffle furnace open to the atmosphere at 1400° F. for 12 hours.

This catalyst was employed in a bench scale reactor having a capacity of approximately 100 ml. of catalyst, in a fixed bed, for the conversion of propylene to acrylonitrile. The feed gases were metered by rotameters, and water was fed by means of a Sigmamotor pump through capillary copper tubing. In the test, a 90 ml. catalyst charge was used. The molar ratio of propylene/ammonia/air/nitrogen/water is given in Table I, together with the apparent contact time and the reaction temperature and yield.

TABLE I

| Example No. | Feed Ratio, $C_3^=$/NH$_3$/Air/N$_2$/H$_2$O Molar Ratio | Apparent Contact Time (seconds) | Temperature, °F. | Percent Conversion Per Pass | | |
|---|---|---|---|---|---|---|
| | | | | Total | Acrylonitrile | Acetonitrile |
| 2 | 1/1.5/12/4/1 | 4 | 865–875 | 60.1 | 20.2 | 5.8 |
| 3 | 1/1.5/12/4/1 | 3 | 830–850 | 61.7 | 39.2 | 4.2 |
| 4 | 1/1.5/12/4/1 | 3 | 900–910 | 58.2 | 17.5 | 4.1 |

Excellent per pass conversions to acrylonitrile are thus obtainable using this catalyst system.

*Examples 5 to 7*

A catalyst system having an Sb:Fe ratio of 8.7:1 was prepared according to the following procedure. 45 g. of antimony metal, finely ground, was dissolved in 186 cc. of nitric acid (specific gravity 1.42) and heated until the evolution of oxides of nitrogen had ceased. To this was added a solution of 17.2 g. of ferric nitrate nonahydrate, dissolved in 200 cc. of water. The mixture was neutralized with 150 cc. of 28% ammonium hydroxide to a pH of 8, and the resulting slurry filtered and washed with 300 cc. of water in three portions. The filter cake was dried at 120° C. overnight, calcined at 800° F. for 12 hours, and heat-treated in a muffle furnace open to the atmosphere for 12 hours. The activated catalyst was then pelleted, and employed in the conversion of propylene to acrylonitrile using the bench scale reactor described in Examples 2 to 4, with the following results.

TABLE II

| Example No. | Feed Ratio, $C_3^=$/NH$_3$/Air/N$_2$/H$_2$O Molar Ratio | Apparent Contact Time (seconds) | Temperature, °F. | Percent Conversion Per Pass | | |
|---|---|---|---|---|---|---|
| | | | | Total | Acrylonitrile | Acetonitrile |
| 5 | 1/1.5/12/4/1 | 5 | 850–875 | 77.1 | 45.8 | 4.8 |
| 6 | 1/1.5/12/4/1 | 4 | 860–880 | 87.3 | 57.8 | 4.5 |

Another portion of catalyst was used for the conversion of propylene to acrolein, using the same bench scale reactor. The feed ratio propylene/air/nitrogen/water was 1/10/10/1. The apparent contact time was 5 seconds and the temperature 900° F. A catalyst charge of 90 ml. was employed. The total conversion per pass was 39.4% with a good yield of acrolein, and only a small amount of acetaldehyde.

*Example 8*

A catalyst system having an Sb:Fe ratio of 8.7:1 was prepared, according to the following procedure.

90 g. of antimony, 50% very fine particles and 50% coarse particles, was placed in 372 cc. of nitric acid (specific gravity 1.42) and the resulting mixture heated until the evolution of oxides of nitrogen had ceased. To this solution was then added a solution of 34.4 g. of ferric nitrate nonahydrate in 400 cc. of water. The mixture was neutralized with 300 cc. of ammonium hydroxide, and the reaction slurry was then filtered. The filter cake was washed with 400 cc. of water containing 20 cc. of ammonium hydroxide. The catalyst was dried overnight, calcined at 800° F. for 16 hours, and heat treated for 16 hours at 1400° F. in a muffle furnace open to the atmosphere.

The activated catalyst was employed using the micro reactor described in Example 1 in the conversion of propylene to acrylonitrile. The catalyst charge was 4.5 g., and the reaction was carried out at 880° F. at an apparent contact time of 3 seconds. The feed molar ratio propylene/NH$_3$/air was 1/1/12. 61.3% of the propylene feed per pass was converted to acrylonitrile, and 2.1% to acetonitrile.

*Example 9*

A catalyst having an Sb:Fe ratio of 64:1 was prepared using the following procedure.

90 g. of antimony metal, less than 80 mesh, was heated in 372 cc. of concentrated nitric acid until evolution of oxides of nitrogen had ceased. To this was added a solution of 4.7 g. of ferric nitrate nonahydrate dissolved in water. The mixture was neutralized with 300 cc. of 28% ammonium hydroxide. The resulting slurry was filtered and washed with three 300 cc. portions of 0.1% ammonium hydroxide solution. After the last wash, air was drawn through the filter cake for 10 minutes. The catalyst was dried at 130° C., calcined overnight at 800° F., and heat-treated overnight at 1400° F. in a muffle furnace open to the atmosphere.

The activated catalyst was employed for the conversion of propylene to acrylonitrile using the micro reactor of Example 1. A 4.8 g. catalyst charge was used. The reaction temperature was 880° F., the apparent contact time 3 seconds, and the feed molar ratio propylene/NH$_3$/air was 1/1/12. 68% of the propylene feed per pass was converted to acrylonitrile, with only traces of acetonitrile.

*Example 10*

A catalyst having an Sb:Fe ratio of 8.7:1 was prepared by oxidizing 45 g. of 325 mesh antimony metal in 186 cc. of boiling concentrated nitric acid. The boiling was continued until the evolution of brown fumes ceased. The resulting suspension of hydrous antimony oxide was added to a solution of 17.4 g. of ferric nitrate nonahydrate in 200 cc. of water. To this was added 28% ammonium hydroxide solution until the pH was 7.2, measured using a pH meter. The resulting slurry was filtered, and washed with three equal portions of a 2.5% ammonium hydroxide solution. The cake was reslurried in water, and placed in a vessel, after which air was bubbled through it for one hour at room temperature. The slurry was refiltered, dried overnight at 120° C., calcined at 800° F. overnight, and heat-treated at 1400° F. overnight in a muffle furnace open to the atmosphere.

The resulting catalyst was used in the conversion of propylene to acrylonitrile, employing the bench scale reactor of Examples 2 to 4. A 90 g. catalyst charge was used. The temperature was 860–870° F., the feed molar ratio propylene/ammonia/air/nitrogen/water was 1/1.5/12/4/1 and the apparent contact time was 4 seconds. The total conversion was 87% per pass. 57.8% of the propylene feed was converted to acrylonitrile and 4% to acetonitrile.

*Example 11*

A catalyst having an Sb:Fe ratio of 8.7:1 supported on an equal weight of antimony phosphate was prepared as follows. 79 g. of antimony metal and 330 cc. of nitric acid (sp. gr. 1.42) were combined and heated until the evolution of oxides of nitrogen had ceased. The mixture was then evaporated almost to dryness, and mixed with 30.2 g. of ferric nitrate nonahydrate. The highly viscous mass was allowed to stand in air for 2 hours at room temperature. It was then dried at 120° C. for 4 hours, calcined at 800° F. overnight, and heat-treated at 1400°

F. for 10 hours in a muffle furnace open to the atmosphere.

145 g. of antimony trioxide were mixed with 115 g. of 85% phosphoric acid. The mixture was stirred for approximately 30 minutes until the heat of reaction had been dissipated, and formation of antimony phosphate was completed. The antimony phosphate was then mixed with the activated catalyst system to produce a homogenous mixture.

This catalyst system was employed using the bench scale reactor of Examples 2 to 4 in the conversion of propylene to acrylonitrile. The feed ratio propylene/ammonia/air/nitrogen/water was 1/1.5/12/4/1. The contact time was 4 seconds and the temperature 840° F., with a catalyst charge of 90 cc. The total propylene conversion per pass was 52%. 29.2% of the propylene feed was converted to acrylonitrile, 1.2% to acetonitrile; and the remainder to carbon oxides.

*Example 12*

The following procedure was employed to prepare a catalyst having an Sb:Fe atomic ratio of 8.8:1 supported on silica. 180 g. of antimony metal (less than 80 mesh) was dissolved in 720 cc. of hot concentrated nitric acid. After all of the metal was oxidized, heating was continued until the mixture was evaporated almost to dryness. At this point, 67.3 g. of ferric nitrate Fe(NO₃)₃·9H₂O was then added with stirring. The mixture was then transferred to a ball mill and mixed for four hours. After this, the mixture was removed from the mill utilizing about 300 mls. of water for the removal and to this was then added 328 g. of a silica sol (30.6% SiO₂) available under the trademark "Ludox." The mixture was stirred and to it was added 2.5 g. ammonium nitrate (NH₄NO₃) and upon slight heating the mixture gelled. The catalyst mixture was then dried for 8 hours at 120–130° C., then calcined for 8 hours at 800° F., and then treated at 1600° F. for 12 hours. The activity of this catalyst for the conversion of propylene to acrolein was determined in a fixed bed reactor at a temperature of 775° F., a contact time of 3 seconds and a mole ratio of propylene/air equivalent to 1/10. The per pass conversion of propylene to acrolein was 63%.

*Example 13*

A silica supported catalyst was prepared following the procedure of Example 12 except that the proportions of the components were such as to provide 60 wt. percent of antimony and iron oxides with an Sb:Fe atomic ratio of 8.7:1 and 40 wt. percent SiO₂.

The activity of this catalyst for the conversion of isobutylene to methacrylonitrile was determined in a fixed bed reactor in the form of a 5 foot long pipe, ½ inch in diameter. The feed was passed through this bed, which was charged with 306 g. of catalyst. The feed was metered with rotameters, and the water was fed by means of a Sigmapump through capillary copper tubing. The process conditions were a temperature of 800° F., an apparent contact time of 4 seconds and a mole ratio of isobutylene/air/NH₃/water of 1/21/1/4, under a pressure of 2 p.s.i.g. The per pass conversion of isobutylene to methacrylonitrile was 45.5%, and 4.7% methacrolein also was formed, at a total isobutylene conversion of 57.8%.

*Example 14*

A silica supported catalyst was prepared following the procedure of Example 12 except that the proportions of the components were such as to provide 62.8 wt. percent of antimony and iron oxides with an Sb:Fe atomic ratio of 5.7:1 and 37.2% SiO₂.

This catalyst was used for the conversion of isobutylene to methacrolein and methacrylic acid, using 306 g. of catalyst in the fixed bed system of Example 13. The temperature was 700° F., the contact time was 4 seconds, and the mole ratio of isobutylene/air/H₂O was 1/8/4. The per pass conversion of isobutylene was 29.9%, of which 22.8% was methacrolein, 5.0% methacrylic acid, and 2.1% acetaldehyde.

We claim:

1. A catalyst composition consisting essentially of an active catalytic oxide complex of antimony and iron as an essential catalytic ingredient, the Sb:Fe atomic ratio being within the range from about 1:50 to about 99:1; said complex being formed by heating the mixed oxides of antimony and iron in the presence of oxygen at an elevated temperature above 500° F. but below their melting point for a time sufficient to form said active catalytic oxide complex of antimony and iron.

2. The catalyst composition in accordance with claim 1 in which the Sb:Fe atomic ratio is within the range of from about 1:1 to about 25:1.

3. A catalyst composition in accordance with claim 1 carried on a support.

4. A catalyst composition in accordance with claim 3 in which the support is silica.

5. A catalyst composition in accordance with claim 1, said complex being further activated by heating at a temperature above about 1000° F., but below its melting point.

6. A catalyst composition consisting essentially of an active catalytic oxide complex of antimony and iron as an essential catalytic ingredient, the catalyst having a composition corresponding to the empirical chemical formula $Sb_aFe_bO_c$, where $a$ is a number within the range from about 1 to about 99, $b$ is a number within the range from about 50 to 1, and $c$ is a number taken to satisfy the average valences of antimony and iron in the oxidation states in which they exist in the catalyst; said complex being formed by heating the mixed oxides of antimony and iron in the presence of oxygen at an elevated temperature above 500° F. but below their melting point for a time sufficient to form said active catalytic oxide complex of antimony and iron.

7. The catalyst composition in accordance with claim 6 in which the Sb:Fe atomic ratio is within the range of from about 1:1 to about 25:1.

References Cited by the Examiner

UNITED STATES PATENTS

| | | | |
|---|---|---|---|
| 1,562,480 | 11/25 | Wietzel | 252—467 X |
| 1,865,770 | 7/32 | Larson | 252—472 X |
| 2,481,826 | 9/49 | Cosby | 260—465.3 |
| 2,621,204 | 12/52 | Maclean et al. | 260—465.3 |
| 2,670,379 | 2/54 | Hadley et al. | 260—604 |
| 2,674,582 | 4/54 | Darby | 252—456 |
| 2,707,706 | 5/55 | Bauch | 252—472 |
| 2,776,316 | 1/57 | Baldwin | 260—604 |
| 2,941,007 | 6/60 | Callahan | 260—604 |
| 3,009,943 | 11/61 | Hadley et al. | 260—465.3 |
| 3,094,565 | 6/63 | Bethell et al. | 252—456 X |
| 3,152,170 | 10/64 | Barclay et al. | 252—456 X |

MAURICE A. BRINDISI, *Primary Examiner.*

CHARLES B. PARKER, *Examiner.*

UNITED STATES PATENT OFFICE
Certificate

Patent No. 3,197,419   Patented July 27, 1965

James L. Callahan and Berthold Gertisser

Application having been made jointly by James L. Callahan and Berthold Gertisser, the inventors named in the patent above identified, and The Standard Oil Company, of Cleveland, Ohio, a corporation of Ohio, the assignee, for the issuance of a certificate under the provisions of Title 35, Section 256 of the United States Code, deleting the name of Berthold Gertisser, from the patent as a joint inventor, and a showing and proof of facts satisfying the requirements of the said section having been submitted, it is this 18th day of February 1969, certified that the name of the said Berthold Gertisser, is hereby deleted from the said patent as a joint inventor with the said James L. Callahan.

[SEAL]

EDWIN L. REYNOLDS,
*First Assistant Commissioner of Patents.*